US007320829B2

(12) United States Patent
Wright et al.

(10) Patent No.: US 7,320,829 B2
(45) Date of Patent: *Jan. 22, 2008

(54) FLUORINATED POLYMER AND AMINE RESIN COMPOSITIONS AND PRODUCTS FORMED THEREFROM

(75) Inventors: Joe A. Wright, Tuscaloosa, AL (US); Daniel D. Woodland, Oswego, IL (US); Raymond J. Weinert, Jr., Macedonia, OH (US); James E. Robbins, Twinsburg, OH (US); Robert E. Medsker, Yorkville, IL (US); Edward N. Kresge, Watchung, NJ (US); Daniel C. Gottschalk, Columbus, MS (US); Guillermina C. Garcia, Copley, OH (US); Martin J. Fay, Orwigsburg, PA (US)

(73) Assignee: OMNOVA Solutions Inc., Fairlawn, OH (US)

( * ) Notice: Subject to any disclaimer, the term of this patent is extended or adjusted under 35 U.S.C. 154(b) by 142 days.

This patent is subject to a terminal disclaimer.

(21) Appl. No.: 10/774,187

(22) Filed: Feb. 5, 2004

(65) Prior Publication Data

US 2004/0224164 A1    Nov. 11, 2004

Related U.S. Application Data

(63) Continuation-in-part of application No. 10/091,754, filed on Mar. 6, 2002, now abandoned, which is a continuation-in-part of application No. 09/698,554, filed on Oct. 27, 2000, now Pat. No. 6,686,051, which is a continuation-in-part of application No. 09/384,464, filed on Aug. 27, 1999, now Pat. No. 6,383,651, which is a continuation-in-part of application No. 09/244,711, filed on Feb. 4, 1999, now Pat. No. 6,423,418, which is a continuation-in-part of application No. 09/035,595, filed on Mar. 5, 1998, now abandoned.

(51) Int. Cl.
*B32B 15/09* (2006.01)
*B32B 27/08* (2006.01)
*B32B 27/10* (2006.01)
*B32B 27/26* (2006.01)
*B32B 27/36* (2006.01)

(52) U.S. Cl. ............... 428/458; 428/480; 428/481; 428/482; 428/483; 528/299; 528/300; 528/308; 528/402; 525/437; 525/438; 525/441; 525/443

(58) Field of Classification Search .................. None
See application file for complete search history.

(56) References Cited

U.S. PATENT DOCUMENTS

| 3,100,722 A | 8/1963 | Hermann et al. |
| 3,834,823 A | 9/1974 | Seregely et al. |
| 3,922,457 A | 11/1975 | Barnwell et al. |
| 3,949,132 A | 4/1976 | Seregely et al. |
| 4,051,195 A | 9/1977 | McWhorter |
| 4,118,541 A | 10/1978 | Power et al. |
| 4,478,907 A | 10/1984 | Van Gossum et al. |
| 4,521,571 A | 6/1985 | Ishido et al. |
| 4,567,073 A * | 1/1986 | Larson et al. .............. 428/40.7 |
| 4,603,074 A | 7/1986 | Pate et al. |
| 4,686,275 A | 8/1987 | Bryant et al. |
| 4,714,657 A | 12/1987 | Quinn et al. |
| 4,746,576 A | 5/1988 | Ozu et al. |
| 4,857,396 A | 8/1989 | Otonari et al. |
| 4,888,381 A | 12/1989 | Pankratz |
| 4,898,981 A | 2/1990 | Falk et al. |
| 4,946,992 A | 8/1990 | Falk et al. |
| 4,988,123 A | 1/1991 | Lin et al. |
| 4,988,797 A | 1/1991 | Wardle et al. |
| 5,025,052 A | 6/1991 | Crater et al. |
| 5,043,221 A | 8/1991 | Koleske |
| 5,045,624 A | 9/1991 | Falk et al. |
| 5,059,700 A * | 10/1991 | Marchionni et al. ......... 549/550 |
| 5,097,048 A | 3/1992 | Falk et al. |
| 5,099,026 A | 3/1992 | Crater et al. |
| 5,166,230 A | 11/1992 | Stecker |
| 5,166,288 A | 11/1992 | Kanai et al. |
| 5,177,226 A * | 1/1993 | Marchionni et al. ......... 549/550 |

(Continued)

FOREIGN PATENT DOCUMENTS

| EP | 0 089 820 A1 * | 9/1983 |
| EP | 0 348 350 | 12/1989 |
| EP | 0 657 503 A2 * | 6/1995 |
| EP | 0 731 130 | 9/1996 |
| WO | WO 96/18699 | 6/1996 |
| WO | WO 96/23828 | 8/1996 |
| WO | WO 99/26992 | 6/1999 |
| WO | WO 99/45079 | 9/1999 |
| WO | WO 00/46270 | 8/2000 |
| WO | WO 02/16306 | 2/2002 |
| WO | WO 02/34848 | 5/2002 |

OTHER PUBLICATIONS

Invoice to Southwest Texas Distributions, Inc., dated Apr. 9, 1998, from GenCorp.
CA entries and Derwent patent family printouts on JP 03275859; JP 04363370; JP 07004064; JP 07039812; JP 08283654; JP 6216941; and JP 63248827.
Letter to Southwest Texas Distributions, Inc. dated Mar. 5, 1998 to Greg Nernes from Barry Bastion, Product Manager, GenCorp.

*Primary Examiner*—Vivian Chen
(74) *Attorney, Agent, or Firm*—Kagan Binder PLLC

(57) ABSTRACT

A reactive fluorinated polymer having polyester and polyether segments is mixed with a reactive melamine resin to form a coating composition. The polyether segment can include monomeric units from an oxetane monomer having pendant fluorine groups that are linked to the oxetane via an ether group. The melamine resin can be a lower alkyl etherified melamine-formaldehyde. The composition can be disposed on a substrate and treated to form a laminate.

22 Claims, No Drawings

U.S. PATENT DOCUMENTS

| | | |
|---|---|---|
| 5,206,066 A | 4/1993 | Horacek |
| 5,210,179 A | 5/1993 | Stewart |
| 5,230,954 A | 7/1993 | Sakamoto et al. |
| 5,302,462 A | 4/1994 | Shah et al. |
| 5,306,758 A * | 4/1994 | Pellerite ............... 524/366 |
| 5,324,764 A | 6/1994 | Fujita et al. |
| 5,361,164 A | 11/1994 | Steliga |
| 5,374,691 A | 12/1994 | Hintze-Bruning et al. |
| 5,468,841 A | 11/1995 | Malik et al. |
| 5,476,721 A | 12/1995 | Simeone et al. |
| 5,543,200 A | 8/1996 | Hargis et al. |
| 5,576,095 A | 11/1996 | Ueda et al. |
| 5,589,552 A * | 12/1996 | Simeone et al. ......... 525/440 |
| 5,637,657 A | 6/1997 | Anton |
| 5,637,772 A | 6/1997 | Malik et al. |
| 5,639,539 A | 6/1997 | DeProspero et al. |
| 5,641,853 A | 6/1997 | Drysdale |
| 5,649,828 A | 7/1997 | Kawashima |
| 5,650,483 A | 7/1997 | Malik et al. |
| 5,654,450 A | 8/1997 | Malik et al. |
| 5,663,289 A | 9/1997 | Archibald et al. |
| 5,668,250 A | 9/1997 | Malik |
| 5,668,251 A | 9/1997 | Malik et al. |
| 5,672,651 A | 9/1997 | Smith |
| 5,674,951 A | 10/1997 | Hargis et al. |
| 5,681,890 A | 10/1997 | Tanaka et al. |
| 5,686,522 A * | 11/1997 | Tonelli et al. ............ 524/539 |
| 5,703,194 A | 12/1997 | Malik et al. |
| 5,707,697 A | 1/1998 | Spain et al. |
| 5,798,402 A | 8/1998 | Fitzgerald et al. |
| 5,807,977 A | 9/1998 | Malik et al. |
| 5,898,046 A | 4/1999 | Raiford et al. |
| 6,033,737 A | 3/2000 | Johnson et al. |
| 6,037,483 A | 3/2000 | Malik et al. |
| 6,040,419 A | 3/2000 | Drysdale et al. |
| 6,168,866 B1 | 1/2001 | Clark |
| 6,180,243 B1 | 1/2001 | Johnson et al. |
| 6,380,351 B1 | 4/2002 | Malik et al. |
| 6,383,651 B1 * | 5/2002 | Weinert et al. ............ 428/482 |
| 6,417,314 B1 | 5/2002 | Weinert et al. |
| 6,423,418 B1 * | 7/2002 | Callicott et al. ........... 428/458 |
| 6,448,368 B1 | 9/2002 | Malik et al. |
| 6,465,566 B2 * | 10/2002 | Garcia et al. ............ 524/591 |
| 6,479,623 B1 | 11/2002 | Malik et al. |
| 6,579,966 B1 * | 6/2003 | Weinert et al. ............ 528/401 |
| 6,660,828 B2 * | 12/2003 | Thomas et al. ............ 528/402 |
| 6,686,051 B1 * | 2/2004 | Weinert et al. ............ 428/458 |
| 2001/0051280 A1 * | 12/2001 | Callicott et al. ........... 428/483 |
| 2002/0127420 A1 * | 9/2002 | Weinert et al. ............ 428/480 |
| 2003/0138650 A1 | 7/2003 | Fay et al. |
| 2004/0219378 A1 * | 11/2004 | Weinert et al. ............ 428/480 |
| 2005/0048213 A1 * | 3/2005 | Callicott et al. ........... 427/384 |
| 2005/0112324 A1 * | 5/2005 | Rosenbaum et al. ........ 428/141 |

\* cited by examiner

US 7,320,829 B2

FLUORINATED POLYMER AND AMINE RESIN COMPOSITIONS AND PRODUCTS FORMED THEREFROM

CROSS REFERENCE

This is a continuation-in-part of prior application Ser. No. 10/091,754, filed Mar. 6, 2002 now abandoned, entitled TWO STAGE THERMOFORMABLE FLUORINATED POLYOXETANE-POLYESTER COPOLYMERS, now abandoned which is in turn a continuation-in-part of prior application Ser. No. 09/698,554, filed Oct. 27, 2000, entitled CURED POLYESTER CONTAINING FLUORINATED SIDE CHAINS, now issued as U.S. Pat. No. 6,686,051; which in turn is a continuation-in-part of prior application Ser. No. 09/384,464, filed Aug. 27, 1999, entitled POLYESTER WITH PARTIALLY FLUORINATED SIDE CHAINS, now issued as U.S. Pat. No. 6,383,651; which in turn is a continuation-in-part of prior application Ser. No. 09/244,711, filed Feb. 4, 1999, entitled EASILY CLEANABLE POLYMER LAMINATES, now issued as U.S. Pat. No. 6,423,418; which in turn is a continuation-in-part of prior application Ser. No. 09/035,595, filed Mar. 5, 1998, entitled EASILY CLEANABLE POLYMER LAMINATES, now abandoned; all five of which are incorporated by reference herein.

FIELD OF INVENTION

The invention pertains to compositions that include a reactive polymer having pendant fluorinated side groups and a reactive melamine resin, and products derived from the reaction of these materials. More specifically, this invention relates to fluorinated polyoxetane-polyester polymers containing polyoxetane derived from polymerizing oxetane monomers having partially or fully fluorinated pendant side chains. The fluorinated polyoxetane-polyester polymers are cured with an alkyl modified melamine formaldehyde crosslinker comprising an alkyl etherified melamine formaldehyde resin.

BACKGROUND OF INVENTION

Melamine crosslinked polyester coatings are commonly used in low and high pressure laminates having flat surfaces. High pressure laminates typically include a multi-layer paper impregnated with melamine based coatings, where the impregnated laminate is cured at relatively high temperature and pressure to produce a finished article having a hard and durable surface. For instance, U.S. Pat. No. 4,603,074 discloses a plasticized PVC polymer layer having a polymeric surface coating comprising a reactive carboxyl functional polyester crosslinked with alkylated benzoguanamine, urea or melamine formaldehyde resin. The PVC can be printed and/or embossed prior to application of the polymeric surface coating, but the cured coating lacks flexibility and is not extensible and cracks during the thermoforming process. Similarly, U.S. Pat. No. 6,033,737 teaches plasticized PVC sheet substrate having a surface coating comprising a water-based polyester crosslinked with amino resin activated by an acid catalyst.

U.S. Pat. No. 5,650,483 describes the preparation of oxetane monomers useful to form oxetane polymers with pendant fluorinated chains. The oxetane polymers in this patent are characterized as having low surface energy, high hydrophobicity, oleophobicity and a low coefficient of friction. That patent is incorporated by reference herein for teachings on how to prepare the oxetane monomers and polymers. Additional patents issued on variations of the oxetane monomers and polymers are as follows: U.S. Pat. No. 5,468,841; 5,654,450; 5,663,289; 5,668,250, and 5,668,251, all of which are also incorporated herein by reference.

SUMMARY OF THE INVENTION

According to the present invention, it has been discovered that a stain resistant layer having good durability and flexibility can be prepared by reacting a fluorinated polymer having polyether and polyester segments with a melamine resin. Laminates can be prepared that have improved stain resistance due to the incorporation of a polymer having repeat units from an oxetane monomer having pendant fluorinated groups into a stain resistant surface layer. The stain resistant layer can also be adhered to a variety of substrates including polyesters, paper, polyolefins, etc. In some aspects, the coatings exhibit dry erase characteristics when dry erase markers are used. While this disclosure generally teaches applying the coating directly to a substrate, it also provides for intermediate coating(s).

In one aspect, the invention provides a laminate that has a layer derived from ingredients that include a reactive polymer and a reactive melamine resin. The reactive polymer includes at least one polyester segment and at least one polyether segment. The polyether segment includes a pendant fluorinated group having an ether moiety and a fluorocarbon moiety. The fluorocarbon moiety is linked to the polyether segment via the ether moiety.

In another aspect, the invention provides a laminate that includes a layer derived from reactive ingredients that include a reactive polymer having a pendant fluorinated group and an alkylated melamine-formaldehyde resin. The pendant fluorinated group includes an ether moiety and a fluorocarbon moiety. The fluorocarbon moiety is linked to the reactive polymer via the ether moiety.

In another aspect, the reactive polymer includes at least one polyester segment and at least one polyoxetane segment. The polyoxetane segment includes a pendant fluorinated group that includes an ether moiety and a fluorocarbon moiety. The fluorocarbon moiety is linked to the polyether segment via the ether moiety.

In another aspect, the invention provides a method for forming a laminate. In the method a composition is provided that includes a reactive polymer and a reactive melamine resin. The reactive polymer includes at least one polyester segment and at least one polyether segment. The polyether segment includes a pendant fluorinated group having an ether moiety and a fluorocarbon moiety. The fluorocarbon moiety is linked to the polyether segment via the ether moiety. The composition can then be incorporated into a laminate, by, for example, disposing the composition on a substrate and treating the composition.

In another aspect, the invention provides a reaction product that is derived from the reactive fluorinated polymer and the reactive melamine resin. In another aspect, the invention provides method for preparing a multilayered article by providing a composition that includes the reactive fluorinated polymer and the reactive melamine resin. The composition is then used to form a layer on a substrate.

In yet another aspect, the invention provides a laminate that has a layer derived from ingredients that include a reactive polymer and a reactive alkylated amine resin. The reactive polymer includes at least one polyester segment and at least one polyether segment. The polyether segment includes a pendant fluorinated group having an ether moiety and a fluorocarbon moiety. The alkylated amine resin can be selected from, for example, alkylated benzoguanamine resins, alkylated urea resins, and alkylated melamine resins.

DETAILED DESCRIPTION OF THE INVENTION

In some embodiments, a coating composition of this invention comprises a melamine resin, for example, an alkyl etherified melamine formaldehyde crosslinking agent, and a reactive fluorinated polymer, for example, a reactive fluorinated polyoxetane-polyester. When partially cured, the composition can form a thermoformable coating layer that can be thermoformed. The polyoxetane-polyester is generally a block copolymer, and, in some embodiments, the curing can occur in two stages.

In other embodiments, an alkylated amine resin can be reacted with the polyoxetane-polyester polymer. Examples of alkylated amine formaldehyde crosslinking agents include alkylated benzoguanamine-formaldehyde, alkylated urea-formaldehyde or, preferably, alkylated melamine-formaldehyde resin. Mixtures of these resins can be used. The alcohol used to modify the benzoguanamine-formaldehyde, urea-formaldehyde or melamine-formaldehyde resin can be n-butanol, n-propanol, isopropanol, ethanol, methanol, and so forth.

In some embodiments, modified amino resins comprising a lower alkyl etherified melamine-formaldehyde resin can be utilized as crosslinking resins for the fluorinated polyoxetane-polyester polymer. The etherified melamine-formaldehyde resin is generally etherified with one or more alkyl groups derived from an alkyl alcohol set forth herein below. Preferred alkyl etherified melamine-formaldehyde resins comprise mixed alkyl groups in the same melamine-formaldehyde molecule. Mixed alkyl groups comprise at least two different alkyl groups, for example, methyl and butyl. Useful alkyl groups comprise lower alkyl chains of 1 to about 6 carbon atoms where 1 to about 4 carbon atoms are preferred. Preferred mixed alkyl groups comprise at least two alkyl chains having a differential of at least two carbon atoms such as methyl/propyl, and preferably a three carbon atom differential such as methyl/butyl.

Melamine-formaldehyde molecules ordinarily comprise a melamine molecule alkylated with at least three formaldehyde molecules and more typically alkylated with four or five formaldehyde groups, while most typically fully alkylated with six formaldehyde groups to yield methanol groups, e.g. hexamethylolmelamine. In accordance with this invention, at least two, desirably three or four, and preferably five or six of the methanol groups are etherified. A melamine-formaldehyde molecule can contain mixed alkyl chains etherified along with one or more non-etherified methanol groups (known as methylol groups), although fully etherified groups are preferred to provide essentially six etherified alkyl groups. Some of the melamine-formaldehyde molecules in a melamine-formaldehyde can be non-alkylated with formaldehyde (i.e. iminom radicals), but preferably minimal to avoid undesirable rapid premature curing and to maintain controlled two stage crosslinking in accordance with this invention.

Mixed alkyl etherified melamine-formaldehyde crosslinking resins used in this invention can be produced in much the same way as conventional mono-alkyl etherified melamine-formaldehyde is produced where subsequently all or most methylol groups are etherified, such as in hexamethyoxymethylmelamine (HMMM). A mixed alkyl etherified melamine-formaldehyde can be produced by step-wise addition of two different lower alkyl alcohols or by simultaneous coetherification of both alcohols, with step-wise etherification being preferred. Typically lesser equivalents of the first etherified alcohol relative to the available methylol equivalents of melamine-formaldehyde are utilized in the first step to assure deficient reaction of alkyl alcohol with available formaldehyde groups, while excess equivalents of the second alcohol are reacted relative to remaining equivalents of formaldehyde in the second step to enable full or nearly full etherification with both alcohols. In either or both alcohol etherification steps, reaction water can be removed by distillation, or by vacuum if necessary, to assure the extent of coetherification desired. A preferred commercial mixed alkyl etherified melamine formaldehyde is Resimene CE-7103, sold by Solutia comprising mixed methyl and butyl alcohol etherified with melamine formaldehyde. The preferred mixed alkyl etherified melamine-formaldehyde exhibits temperature sensitive curing where reactivity is in two stages to provide a partially cured thermoformable laminate which can be more fully or fully cured at higher temperatures to provide hard surfaces.

In some embodiments, the fluorinated polyoxetane-polyester polymer is a block copolymer which contains a preformed fluorine modified polyoxetane having terminal hydroxyl groups. Hydroxyl terminated polyoxetane prepolymers comprise polymerized repeat units of an oxetane monomer having a pendant —$CH_2$—O—$(CH_2)_n$—Rf group prepared from the polymerization of oxetane monomer with fluorinated side chains. These polyoxetanes can be prepared in a manner as set forth herein below, and also according to the teachings of U.S. Pat. Nos. 5,650,483; 5,668,250; 5,668,251; and 5,663,289, hereby fully incorporated by reference. The oxetane monomer desirably has the structure:

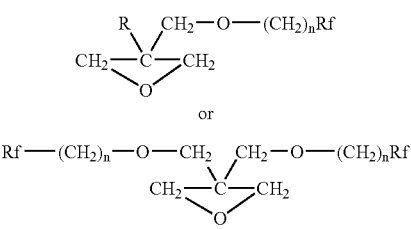

wherein n is an integer from 1 to 5, preferably from 1 to 3, and Rf, independently, on each monomer is a linear or branched, preferably saturated alkyl group of from about 1 to about 20, preferably from about 2 to about 10 carbon atoms with a minimum of 25%, 50%, 75%, 85%, or 95%, or preferably 100% perfluorinated with the H atoms of said Rf being replaced by F, R being H or an alkyl of 1 to 6 carbon atoms. The polyoxetane prepolymer can be an oligomer, a homopolymer, or a copolymer.

The repeating units from said oxetane monomers desirably have the structure

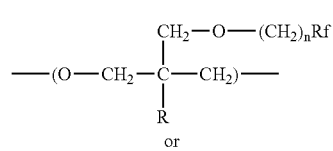

or

-continued

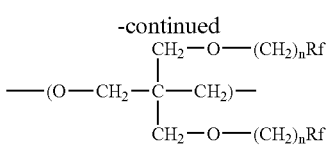

where n, Rf, and R are as described above. The degree of polymerization of the fluorinated oxetane can be from 6 to 100, advantageously from 10 to 50, and preferably 15 to 25 to produce a partially fluorinated polyoxetane prepolymer.

The hydroxyl terminated polyoxetane prepolymer comprising repeat units of copolymerized oxetane monomers ordinarily have two terminal hydroxyl groups. Useful polyoxetanes desirably have number average molecular weights from about 100, 250, 500, 1,000 or 5,000 to about 50,000 or 100,000, and can be a homopolymer or a copolymer of two or more different oxetane monomers. The polyoxetane prepolymer may be a copolymer including very minor amounts of non-fluorinated cyclic ether molecules having from 2 to 4 carbon atoms in the ring such as tetrahydrofuran and one or more oxetane monomers as described in the previously incorporated U.S. Pat. No. 5,668,250. Such a copolymer may also include very minor amounts of copolymerizable substituted cyclic ethers such as substituted tetrahydrofuran. The repeat unit from a tetrahydrofuran monomer has the formula —(O—CH$_2$—CH$_2$—CH$_2$—CH$_2$—). In some embodiments, the hydroxyl terminated polyoxetane prepolymer can include from 0% or 0.1% to 10%, advantageously 1% to 5%, and preferably 2% to 3% copolymerized THF based on the weight of the preformed hydroxyl terminated polyoxetane copolymer. The preferred polyoxetane prepolymer contains two terminal hydroxyl groups to be chemically reacted and bound into the polyoxetane-polyester polymer.

The fluorinated polyoxetane-polyester polymers are made by a condensation polymerization reaction, usually with heat in the presence of a catalyst, of the preformed fluorinated polyoxetane with a mixture of at least one dicarboxylic acid or anhydride and a dihydric alcohol. The resulting fluorinated polyoxetane-polyester polymer is a statistical polymer and may contain active hydrogen atoms, e.g., terminal carboxylic acid groups and/or hydroxyl groups for reaction with the alkyl etherified melamine-formaldehyde crosslinking resin. The ester forming reaction temperatures generally range from about 110° C. to about 275° C., and desirably from about 215° C. to about 250° C. in the presence of suitable catalysts such as 0.1% dibutyl tin oxide. Preferred carboxylic acid reactants are dicarboxylic acids and anhydrides. Examples of useful dicarboxylic acids include adipic acid, azelaic acid, sebacic acid, cyclohexane dioic acid, succinic acid, terephthalic acid, isophthalic acid, phthalic anhydride and acid, and similar aliphatic and aromatic dicarboxylic acids. A preferred aliphatic dicarboxylic acid is adipic acid and a preferred dicarboxylic aromatic acid is isophthalic acid. Generally, the aliphatic carboxylic acids have from about 3 to about 10 carbon atoms, while aromatic carboxylic acids generally have from about 8 or 10 to about 25 or 30 carbon atoms.

Useful polyhydric alcohols generally have from about 2 to about 20 carbon atoms and 2 or more hydroxyl groups, where diols are preferred. Examples of useful polyols, especially diols, include ethylene glycol, propylene glycol, diethylene glycol, dipropylene glycol, glycerin, butylene glycol, higher alkyl glycols such as neopentyl glycol, 2,2-dimethyl-1,3-propanediol, and polyols such as trimethylol propane, 1,4-cyclohexanedimethanol, glycerol pentaerythritol, trimethylolethane. Mixtures of the polyols and polycarboxylic acids can be used where diols and dicarboxylic acids dominate and higher functionality polyols and polyacids are minimized. An example of a preferred reactive polyester is the condensation product of trimethylol propane, 2,2-dimethyl-1,3-propanediol, 1,4-cyclohexanedimethanol, isophthalic acid or phthalic anhydride, and adipic acid.

The fluorinated polyoxetane-polyester polymer is made by a condensation polymerization reaction in the presence of heat and usually a catalyst with the above noted dicarboxylic acids or anhydrides and the above noted diols. The polyester component of the present invention can be formed by reacting the ester forming reactants in the presence of a preformed intermediate fluorinated polyoxetane oligomer, polymer, or copolymer to provide an ester linkage derived from esterifying a dicarboxylic acid or anhydride with the preformed polyoxetane. Alternatively, a preformed polyester intermediate can be formed from diols and dicarboxylic acids, which is then reacted with the preformed fluorinated polyoxetane oligomer, polymer, or copolymer to form the ester linkage between the respective preformed components. Thus, block copolymers are generally formed.

In preparing the hydroxyl or carboxyl functional polyoxetane-polyester polymer, it is preferred to pre-react, the hydroxyl terminated fluorinated polyoxetane oligomer, polymer, or copolymer, (polyoxetane prepolymer) with dicarboxylic acid or anhydride to assure copolymerizing the fluorinated polyoxetane prepolymer into the polyoxetane-polyester polymer via an ester linkage, which increases the percentage of fluorinated polyoxetane prepolymer incorporated into the polyoxetane-polyester polymer. A preferred process to form the ester linkage comprises reacting the hydroxyl terminated fluorinated polyoxetane prepolymer with excess equivalents of carboxylic acid from a linear dicarboxylic acid having from 3 to 10 or 30 carbon atoms such as malonic acid, or succinic acid, or glutaric acid, or adipic acid, or pimelic acid, or maleic acid, or fumaric acid, or cyclic cyclohexane dioic acid, under conditions effective to form a polyoxetane ester intermediate from the hydroxyl groups of the polyoxetane prepolymer and the carboxylic acid group of the dicarboxylic acid or anhydride. More desirably, the excess of carboxylic acid groups is at least 2.05 or 2.1 equivalents reacted with one equivalent of hydroxy terminated polyoxetane prepolymer to provide a predominantly carboxyl terminated intermediate prepolymer. The reaction temperature is generally from about 110° C. to about 275° C. and desirably from about 215° C. to about 250° C. In the preferred embodiment for producing the ester intermediate prepolymer, the amount of other diols are small or zero to force the carboxylic acid groups to react with the hydroxyl groups of the fluorinated polyoxetane prepolymer. Desirably, the equivalents of hydroxyls from other diols are less than 0.5, more desirably less than 0.2 and preferably less than 0.1 per equivalent of hydroxyls from the fluorinated polyoxetane prepolymer until after at least 70%, 80%, 90%, or 95% of the hydroxyl groups of the polyoxetane prepolymer are converted to ester links by reaction with the dicarboxylic acid.

The preferred carboxylic acid functional polyoxetane intermediate can then be reacted with other diol and dicarboxylic acid reactants to form the polyoxetane-polyester polymer. Although excess hydroxyl or carboxyl equivalents can be utilized to produce either hydroxyl or carboxyl functional polyoxetane-polyester polymer useful in this invention, preferably excess hydroxyl equivalents are copolymerized to provide a hydroxyl terminated polyoxetane-polyester polymer. Polyoxetane repeating units are usually disproportionately present at the surface of the coating due to the low surface tension of those polymerized units. The amount of surface fluorine groups can be determined by XPS (x-ray photoelectron spectroscopy).

While not as desirable, an alternative route of reacting the hydroxyl terminated fluorinated polyoxetane oligomer, polymer, or copolymer (polyoxetane prepolymer) can be reacted directly with a preformed polyester. In this procedure, the various polyester forming diols and dicarboxylic acids are first reacted to form a polyester block which is then reacted with a polyoxetane prepolymer.

The amount of fluorinated polyoxetane copolymerized in the polyoxetane-polyester polymer is desirably from about 0.1% to about 10%, advantageously from about 0.5% to about 5%, and preferably from 0.5% to about 2% or about 3% by weight based on the weight of the fluorinated polyoxetane-polyester polymer. If the hydroxyl terminated polyoxetane prepolymer includes a significant amount of copolymerized comonomer repeat units from tetrahydrofuran or other cyclic ether, the hydroxyl terminated polyoxetane prepolymer weight can exceed the level of copolymerized oxetane repeating units noted immediately above by the amount of other copolymerized cyclic ether other than oxetane used to form the polyoxetane copolymer.

The amount of the various components in the coating will be generally specified in relationship to 100% by weight of resin solids of the polyoxetane-polyester polymer and the alkyl etherified melamine-formaldehyde. The weight percent of alkyl etherified melamine formaldehyde crosslinking agent in the coating is at least 10%, desirably from about 10% to about 80%, preferably from about 20% to about 70% and most preferably from about 40% to about 60% by weight of the resin binder solids of the coating composition of this invention, with the balance 20% to 90% being fluorinated polyoxetane-polyester polymer on a total resin weight basis.

The etherified melamine formaldehyde of this invention can be used with a strong catalyst such as para-toluene sulfonic acid (PTSA) or methyl sulfonic acid (MSA). Useful acid catalysts can include boric acid, phosphoric acid, sulfate acid, hypochlorides, oxalic acid and ammonium salts thereof, sodium or barium ethyl sulfates, sulfonic acids, and similar acid catalysts. Other preferred useful catalysts include dodecyl benzene sulfonic acid (DDBSA), amine blocked alkane sulfonic acid (MCAT 12195), amine blocked dodecyl para-toluene sulfonic acid (BYK 460), and amine blocked dodecyl benezene sulfonic acid (Nacure 5543). Ordinarily from about 1% to about 15% and preferably about 3% to about 10% acid catalyst is utilized based on polyalkyletherified melamine formaldehyde used.

The fluorinated polyoxetane modified polyester polymer adapted to be crosslinked with an alkyl etherified melamine-formaldehyde will provide a polymeric surface coating suitable for application to a substrate such as PVC and can be cured in generally two stages comprising, a first low temperature stage to form a partially cured thermoformable polymeric layer applied to the PVC substrate, and a second higher temperature stage in conjunction with thermoforming the thermoformable layer and the PVC substrate into a desired configuration, where the applied surface coating is more fully cured and forms a hard surface coating. The two stage reactive etherified melamine-formaldehyde crosslinking component produces a thermoformable laminate of partially cured tack free thermoformable surface coating in the first stage, and a cured, hard coating in the second stage with the applied and cured laminate residing on a contoured article.

A thermoformable surface coating for application to a thermoformable substrate, such as a plastic sheet, and subsequent thermoforming into a desired configuration is based on a polymeric coating comprising a reactive fluorinated polyoxetane-polyester polymer adapted to be cured with an alkyl etherified melamine-formaldehyde. The alkyl etherified melamine-formaldehyde can have two different lower alkyl groups etherified with available methylol groups on the melamine formaldehyde molecule. In the first stage, low temperature drying and curing at temperatures up to about 180° F. provides a partially cured thermoformable coating adhered to the thermoformable substrate. In the second stage, the thermoformable coating is further activated at higher temperatures to cure during the high temperature curing stage and to conform the coated substrate to the desired configuration and provide a hard surface coating.

The amount of catalyst used is an amount that effectively catalyzes the mutual partial curing of the polyoxetane-polyester polymer and alkyl etherified melamine formaldehyde resin in the first stage as well as second stage curing under conditions chosen at elevated curing temperatures. The first stage curing temperature is between about 120° F. and 180° F., while the second stage curing temperature is above 180° F. and preferably between about 190° F. and about 300° F.

The amount of carriers and/or solvent(s) in the coating composition can vary widely depending on the coating viscosity desired for application purposes, and solubility of the components in the solvent. The solvent(s) can be any conventional solvent for polyoxetane-polyester and melamine-formaldehyde crosslinker resin systems. These carriers and/or solvents include ketones of from 3 to 15 carbon atoms e.g. methyl ethyl ketone or methyl isobutyl ketone, alkylene glycols and/or alkylene glycol alkyl ethers having from 3 to 20 carbon atoms, acetates and their derivatives, ethylene carbonate, etc. Suitable alcohol solvents include $C_1$ to $C_8$ monoalcohols such as methyl, ethyl, propyl, butyl alcohols, as well as cyclic alcohols such as cyclohexanol. Illustrative U.S. patents of the carrier and/or solvent systems available include U.S. Pat. Nos. 4,603,074; 4,478,907; 4,888,381 and 5,374,691, which are hereby incorporated by reference for their teachings both of carriers and/or solvent systems for polyesters. Most acetate type solvents can be used, e.g. n-butyl acetate, where a preferred solvent is n-propyl acetate. The amount of solvent(s) can desirably vary from about 20 parts by weight to about 400 parts by weight per 100 parts by weight of total polyoxetane-polyester blocks and the etherified melamine-formaldehyde crosslinker resin solids.

Conventional flattening agents can be used in the coating composition in conventional amounts to control the gloss of the coating surface to an acceptable value. Examples of conventional flattening agents include the various waxes, silicas, aluminum oxide, alpha silica carbide, etc. Amounts desirably vary from about 0 or about 0.1 to about 5 or about 10 parts by weight per 100 parts by weight total of resin solids of polyoxetane-polyester polymer and etherified melamine formaldehyde.

Additionally other conventional additives can be formulated into the coating composition for particular applications. Examples include viscosity modifiers, antioxidants, antiozonants, processing aids, pigments, fillers, ultraviolet light absorbers, adhesion promoters, emulsifiers, dispersants, solvents, crosslinking agents, etc.

Intermediate coating(s) known as decorative coatings to provide a monochromatic or multicolored background or a printed (patterned) background can be likewise produced in accordance with this invention. Decorative coatings include designs, flowers, figures, graphs, maps, etc.

The thermoformable coatings of this invention can be applied to thermoformable substrates such as plastics. Examples of useful substrates that can be coated with coating compositions derived from this invention include cellulosic products (coated and uncoated paper), fibers and synthetic polymers including such as PVC preferably, or thermoplastic polyester, polyolefins, alpha olefin polymers and copolymers, polyvinyl acetate, and poly(meth)acrylates and similar thermoformable flexible or semi-rigid or rigid substrates. The substrate can be with or without a backing, with or without printing or embossment or decoration.

The thermoformed coated plastic such as PVC also can be applied to a preformed contoured solid structure or article, such as wood, to form a laminated article of a high draw or contoured article. Useful articles for example can be contoured cabinet doors, decorative formed peripheral edges on flat table tops, and similar contoured furniture configurations, as well as table tops and side panels, desks, chairs, counter tops, furniture drawers, hand rails, moldings, window frames, door panels, and electronic cabinets such as media centers, speakers, and similar contoured configurations.

The cross-linked reaction product can be included in a stain resistant and adherent layer on a substrate. The substrate can printed at least one time, embossed, or both printed and embossed. The substrates may be any material which would benefit from a stain resistance or dry-erase coating. Examples include cellulosic products (coated and uncoated paper, boardstock, cardboard, wood and paneling), fibers, synthetic polymers (including polyolefins, polyesters, polycarbonates, polystyrene, poly (methacrylates) and especially highly filled or highly plasticized ones which are more permeable towards stains e.g. polyvinyl chloride), metals (requiring temporary or permanent protection from stains), and ceramics. The cross-linked reaction product also can be included in a protective coating.

The substrate with stain resistant layers of the present invention are particularly useful as dry erase writing surfaces (including boards, posters, papers, clipboards, menus, etc.) wallcoverings, anti graffiti surfaces e.g. in public areas including restrooms, and in kitchens and food preparation areas. However, these stain resistant laminates, also, can be used in the manufacture of tablecloths, shoe uppers, luggage exteriors, upholstery, vehicle interiors and seats, golf bags and other sporting goods and so forth.

In one embodiment the substrate includes a layer of plasticized vinyl chloride polymer.

The vinyl chloride layer may be a vinyl chloride polymer, which is a plastisol coated and fused or is a plasticized vinyl chloride polymer composition which has been calendered or extruded. The vinyl chloride may be applied to a backing, substrate or support. In either case the polyvinyl chloride layer (about 1 to 30 or 100 mils thick) can be printed one or more times. The printed layer can be embossed, before and/or after printing, and finally coated with a layer of a solution of a said polyester-amino resin composition and cured to provide the vinyl chloride polymer layer with an outer stain resistant layer about 0.1 to 2 or 4 mils or more thick.

The polyvinyl chloride can be an emulsion (plastisol grade) or a suspension grade vinyl chloride polymer. The vinyl chloride polymer can be polyvinyl chloride homopolymer (preferred) or a copolymer of a major amount by weight of repeat units from vinyl chloride and a minor amount by weight from a copolymerizable monomer selected from the group consisting of vinyl acetate, vinylidene chloride and maleic ester. Bulk and solution vinyl chloride polymers, also may be used. Mixtures of vinyl chloride polymers can be used. Vinyl chloride polymers and copolymers are well known and include those set forth in "Vinyl and Related Polymers," Schildknecht, John Wiley & Sons, Inc., New York, 1952; Sarvetnick, "Polyvinyl Chloride," Van Nostrand Reinhold Company, New York 1969; Sarvetnick, "Plastisols and Organosols," Van Nostrand Reinhold Company, New York, 1972 and "Modern Plastics Encyclopedia 1980-1981," October, 1980, Volume 57, No. 10A, McGraw-Hill Inc., New York.

The amount of plasticizer used to plasticize the vinyl chloride polymer to make it flexible may vary from about 20 or 30 to about 100 parts by weight per 100 parts by weight of total vinyl chloride polymer resin more desirably from about 20 or 30 to about 50 or 60 parts by weight for wallpaper applications and from about 60 to about 100 parts by weight for upholstery type applications per 100 parts by weight of total polyvinyl chloride. Any conventional plasticizer for PVC can be used. Examples of plasticizers which may be used are butyl octyl phthalate, dioctyl phthalate, hexyl decyl phthalate, dihexyl phthalate, diisooctyl phthalate, dicapryl adipate, dioctyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate and so forth. Mixtures of plasticizers may be used.

Other vinyl chloride polymer compounding ingredients are desirably incorporated in the vinyl chloride polymer compositions. Examples of such ingredients are the silicas such as precipitated silica, fumed colloidal silica, calcium silicate and the like, calcium carbonate, ultra violet light absorbers, fungicides, carbon black, barytes, barium-cadmium-zinc stabilizers, barium-cadmium stabilizers, tin stabilizers, dibasic lead phosphite, $Sb_2O_3$, zinc borate, molybdates such as ammonium octa-molybdates, aluminum oxide, aluminum trihydrate and so forth and mixtures of the same. $TiO_2$, red iron oxide, phthalocyanine blue or green or other color pigments can be used. The pigments and the other dry additives preferably are dispersed or dissolved in one or more plasticizers before adding to the plasticized vinyl chloride polymer compositions. These compounding ingredients are used in effective amounts by weight to control color, mildew, stabilization to ultraviolet light and heat, viscosity and so forth of the plasticized vinyl chloride polymer.

The vinyl chloride polymer composition may contain suitable blowing or foaming agents such as sodium bicarbonate, and the organic agents like 1,1-azobisformamide, 4,4-oxybis (benzene sulfonylhydrazide), p-toluenesulfonyl hydrazide, or water and so forth to form a cellular or foamed vinyl chloride polymer composition layer or sheet on fusing. The blowing agents may require an activator. Such blowing agents are well known.

Vinyl chloride polymer blending or extender resins, also, can be used in the compositions in a minor amount by weight as compared to the vinyl chloride polymer composition.

The ingredients forming the vinyl chloride polymer composition may be charged to and mixed together in any one of several mixing devices such as a Ross Planetary mixer, Hobart dough type mixer, Banbury, 2-roll rubber mill, Nauta mixer and ribbon blender and so forth.

The vinyl chloride polymer composition can be formed into layers of films, which can be unsupported or supported (preferred). Where a vinyl chloride polymer plastisol composition is used, it may be cast on a release surface and heated to fuse it to form a film. Where a plasticized suspension grade vinyl chloride polymer composition is used, it can be calendered or extruded and fused to form a film. Temperatures may vary from about 200 to about 400° F. (93-204° C.). However, it is preferred that in either case the compounded vinyl chloride polymer compositions be supported or have a backing. In the case of the supported vinyl chloride polymer composition, the substrate can be a woven fabric (drill, scrim, cheesecloth, and so forth), a knit fabric, a non-woven fabric, paper etc. The fabric can be continuous, discontinuous, woven, nonwoven, bundled etc and made of cotton, cellulose, nylon, polyester, aramid, glass, rayon or acrylic fibers or cords or mixtures of the same. It may be necessary in some instances to treat the fabric with an adhesive coating or dip to adhere or improve adhesion of the fabric to the vinyl chloride polymer composition.

The vinyl chloride polymer composition film or layer, supported or unsupported, is preferably printed on the surface with a suitable vinyl chloride polymer receptive ink to form desirable and novel pattern and/or design. Such inks are well known and can be applied by various methods of printing such as by gravure, flexography, screen printing, jet printing, web printing, non-impact printing and so forth as for example, set forth in "Modern Plastics Encyclopedia 1980-1981," pages 464-465. The printing operation may be repeated for up to five times or more to vary the colors and designs at temperatures of desirably from about 150 to about 165° F. (66-74° C.) for each printing step.

The vinyl chloride polymer composition film or layer, supported or unsupported, printed or unprinted, is preferably embossed to texture the vinyl chloride layer to provide a pattern or design for esthetic or functional purposes. Embossing of thermoplastic films, layers or sheets is well known and is usually carried out by passing the film between an embossing roll and a backup roll under controlled preheating and post-cooling conditions. See "Modern Plastics Encyclopedia 1980-1981," pages 454-45. Additional decorating or printing can sometimes be done with the above stated inks over the embossed vinyl chloride polymer surface for better aesthetic purposes.

The cured applied coatings retain film integrity characteristics free of undesirable cracking while exhibiting improved extensibility during the thermoforming step and having significantly improved durability, chemical resistance, stain resistance, scratch resistance, water stain resistance, and similar mar resistance characteristics, as well as good surface gloss control on the fully laminated product.

The thermoformable substrate film or layer, supported or unsupported, printed or unprinted, or decorated, single or multiple colored, can be smooth or embossed to texture the vinyl chloride layer to provide a pattern or design for esthetic or functional purposes. Embossing of thermoplastic films, layers or sheets is well known and is usually carried out by passing the film between an embossing roll and a backup roll under controlled preheating and post-cooling conditions.

Controlled generally two stage temperature dependent curing depends on the softening point of the thermoformable substrate. In particular, a wet coating is applied to a substrate (e.g. plastic) and dried to form a composite of dried coating on the substrate. The composite is then partially cured at low temperatures to form a thermoformable laminate of partially cured coating adhered to the substrate. First stage partial curing temperatures are at web temperatures below 180° F., desirably between about 120° F. and about 170° F., and preferably between about 150° F. and about 160° F., to form the laminate of partially cured thermoformable coating adhered to the substrate. Dwell time is broadly between about 2 seconds and about 60 seconds, preferably between about 10 seconds and about 20 seconds, depending on the partial curing temperature. The first stage low temperature partial curing provides a thermoformable polymeric coating while avoiding thermosetting crosslinking to form the thermoformable laminate, which can be thermoformed into any desired contour or shape. The intermediate thermoformable coating is advantageously extensible and should exhibit at least about 150% elongation at 180° F. after the first stage partial curing step. Generally, partial curing is about 70% to about 80% of the full cure of a fully cured coating. The resulting thermoformable laminate is tack free, avoids blocking or inter surface adhesion between adjacent layers when rolled or stacked in sheets, and further avoids deformation due to accumulated weight due to rolling or stacking.

In the second stage, the thermoformable laminate can then be applied to an article or structural form with established contours, draws, or configurations and fully cured at high temperatures above 181° F., and preferably from about 190° F. to about 300° F. web temperature, to provide a hard, fully cured, crack-free, mar resistant coating. Dwell time is broadly between about 30 seconds and about five minutes depending on the curing temperature. The contoured structural form, as noted above, can be a solid substrate, such as an unfinished contoured desktop, where the thermoformable laminate is contoured, thermoset, and adhered directly to the contoured solid article. Alternatively, the form can be a mold for forming a free standing thermoset contoured laminate adapted to be adhered subsequently to an unfinished contoured article. The fully cured surface exhibits considerable mar resistance along with other cured film integrity properties. Cured or fully cured coatings exhibit MEK resistance of at least about 50 MEK rubs and preferably above about 100 MEK rubs. It is readily seen that two stage step-wise heating can be achieved in two or more multiple heat curing steps to provide partial curing and full curing in accordance with this invention.

The following examples will serve to illustrate the present invention in respect to Preparation of Mono and Bis(Fluorooxetane) Monomers. Various fluorinated oxetane monomers can be made in accordance with U.S. Pat. Nos. 5,650,483; 5,668,250; 5,668,251; and 5,663,289; which have been fully incorporated by reference. While the following representative examples relate to the preparation of specific FOX (fluorooxetane) monomers, other mono or bis FOX monomers can be prepared in a very similar manner.

Additional description of materials and methods relating to the reaction product of the invention and uses thereof are discussed in applicants' U.S. provisional application titled "Two Stage Thermoformable Coating Compositions" having U.S. Ser. No. 60/541,774, filed Feb. 5, 2004, in the names of inventors including Guillermina C. Garcia, Mike Easterling, Martin Fay, Raymond J. Weinert, and James E. Robbins.

EXAMPLE 1

Preparation of 3-FOX Monomer
3-(2,2,2-Trifluoroethoxymethyl)-3-Methyloxetane

Synthesis of the 3-FOX oxetane monomer is performed as follows: A dispersion of 50 weight percent (2.8 grams, 58.3 mmol) sodium hydride in mineral oil, was washed twice with hexanes and suspended in 35 milliliters of dimethylformamide. Then, 5.2 grams (52 mmol) of trifluoroethanol was added and the mixture was stirred for 45 minutes. A solution of 10.0 grams (39 mmol) of 3-hydroxymethyl-3-methyloxetane p-toluenesulfonate in 15 milliliters of dimethylformamide was added and the mixture was heated at 75° C.-85° C. for 20 hours, when $^1$H MNR analysis of an aliquot sample showed that the starting sulfonate had been consumed.

The mixture was poured into 100 milliliters of ice water and extracted with 2 volumes of methylene chloride. The combined organic extracts were washed twice with water, twice with 2 weight percent aqueous hydrochloric acid, brine, dried over magnesium sulfate, and evaporated to give 6.5 grams of 3-(2,2,2-trifluoroethoxymethyl)-3-methyloxetane as an oil containing less than 1 weight percent dimethyl formamide. The yield of this product was 90%. The oil was distilled at 30° C. and 0.2 millimeters mercury pressure to give 4.3 grams of analytically pure 3-FOX, corresponding to a 60% yield. The analyses of the product were as follows: IR (KBr) 2960-2880, 1360-1080, 990, 840 cm$^{-1}$; $^1$H NMR δ 1.33 (s, 3H), 3.65 (s, 2H), 3.86 (q, J=8.8 Hz, 2H), 4.35 (d, J=5.6 Hz, 2H), 4.51 (d, J=5.6 Hz, 2H); $^{13}$C NMR δ 20.72, 39.74, 68.38 (q, J=40 Hz), 77.63, 79.41, 124 (q, J=272 Hz). The calculated elemental analysis for $C_7H_{11}F_3O_2$ is: C=45.65; H=6.02; F=30.95. The experimental analysis found: C=45.28; H=5.83; F=30.59.

EXAMPLE 2

Preparation of 5-FOX Monomer

TABLE 1

| Material | Scale | Ratio Weight | Weight (S × Ratio) | MW | Mmoles | Mole Ratio | Density |
|---|---|---|---|---|---|---|---|
| pentafluoropropanol | 100 | 1.00 | 100.00 | 150.05 | 666.44 | 1.00 | 1.373 |
| BrMMO | | 1.112 | 112.18 | 165.02 | 679.77 | 1.02 | 1.435 |
| TBAB | | 0.0537 | 5.37 | 322.37 | 16.66 | 0.025 | 1 |
| Water | | 0.385 | 38.53 | 18.01 | 2139.27 | 3.21 | 1.000 |
| 45% aq. KOH | | 0.914 | 91.39 | 56.10 | 733.08 | 1.10 | 1.180 |
| Water | | 0.616 | 61.57 | 18.01 | 3418.84 | 5.13 | 1.000 |
| 45% aq. KOH | | 0.027 | 2.66 | 56.01 | 21.33 | 0.032 | 1.180 |
| Water | | 0.588 | 58.81 | 18.01 | 3265.56 | 4.90 | 1.000 |
| Theoretical Yield (g) | 156.1 | | | | | | |
| Expected Yield, low (g) | 117.0 | | | | | | |
| Expected Yield, high (g) | 148.2 | | | | | | |
| Solids Loading, % | 44.9 | | | | | | |

Pentafluoropropanol, BrMMO, Tetrabutyl Ammonium bromide, and water (in amounts as shown in Table 1) were added to a 500 ml round bottomed flask equipped with a magnetic stirrer, thermometer, and addition funnel. The reactor was heated to 85° C., and 45% aqueous potassium hydroxide was added over 1 hour. The reactor was allowed to stir for an additional 4 hours. A 2-phase reaction mixture with a light yellow organic phase resulted. The reaction mixture was poured into a separatory funnel where the aqueous phase was removed. The organic layer was separated and washed with 45% potassium hydroxide, and deionized water. 152.31 grams of light yellow crude 5-FOX monomer was isolated. 15.40 grams of hexane was added, and the mixture was distilled. Low boilers distilled at 55° C.-60° C. at atmospheric pressure. The mixture was slowly subjected to vacuum, and additional low boilers were collected below 70° C. The vacuum was slowly increased, and 5-FOX monomer distilled from 96° C.-102° C. The vacuum was 28 inches of mercury. 133.85 grams of pure 5-FOX monomer was isolated, or 85%. Both $^1$H and $^{13}$C spectra are consistent with 5-FOX monomer $C_8H_{11}F_5O_2$ molecular weight=234.16.

EXAMPLE 3

Preparation of 7-FOX Using PTC Process 3-(2,2,3,3,4,4,4-Heptafluorobutoxymethyl)-3-Methyloxetane A 2 L, 3 necked round bottom flask fitted with a reflux condenser, a mechanical stirrer, a digital thermometer and an addition funnel was charged with 3-bromomethyl-3-methyloxetane (351.5 g, 2.13 mol), heptafluorobutan-1-ol (426.7 g, 2.13 mol), tetrabutylammonium bromide (34.4 g) and water (85 ml). The mixture was stirred and heated to 75° C. Next, a solution of potassium hydroxide (158 g, 87% pure, 2.45 mol) in water (200 ml) was added and the mixture was stirred vigorously at 80°-85° C. for 4 hours. The progress of the reaction was monitored by GLC and when GLC analysis revealed that the starting materials were consumed, the heat was removed and the mixture was cooled to room temperature. The reaction mixture was diluted with water and the organic layer was separated and washed with water, dried and filtered to give 566 g (94%) of crude product. The crude product was transferred to a distillation flask fitted with a 6 inch column and distilled as follows:

Fraction #1, boiling between 20° C.-23° C./10 mm-Hg, was found to be a mixture of heptafluorobutanol and other low boiling impurities, was discarded;

Fraction #2, boiling between 23° C. and 75° C./1 mm-Hg, was found to be a mixture of heptafluorobutanol and 7-FOX, was also discarded; and Fraction #3, boiling at 75° C./1 mm-Hg was >99% pure 7-FOX representing an overall yield of 80.2%

NMR and GLC data revealed that 7-FOX produced by this method was identical to 7-FOX prepared using the sodium hydride/DMF process.

EXAMPLE 4

Preparation of 3,3-bis(2,2,2-trifluroethoxymethyl)oxetane(B3-FOX)

Sodium hydride (50% dispersion in mineral oil, 18.4 g, 0.383 mol) was washed with hexanes (2×) and was suspended in DMF (200 mL). Then trifluoroethanol (38.3 g, 0.383 mol) was added dropwise over 45 min while hydrogen gas was evolved. The mixture was stirred for 30 min and a solution of 3,3-bis-(hydroxymethyl)oxetane di-p-toluenesulfonate (30.0 g, 0.073 mol) in DMF (50 mL) was added. The mixture was heated to 75° C. for 64 h when $^1$H NMR analysis of an aliquot showed that the starting sulfonate had been consumed. The mixture was poured into water and extracted with methylene chloride (2×). The combined organic extracts were washed with brine, 2% aqueous HCl, water, dried (MgSO4), and evaporated to give 17.5 g (100%) of 3,3-bis-(2,2,2-trifluoroethoxymethyl)oxetane as an oil containing DMF (<1%). The oil was purified by bulb-to-bulb distillation at 42° C.-48° C. (10.1 mm) to give 15.6 g (79%) of analytically pure B3-FOX, colorless oil: IR (KBr) 2960-2880, 1360-1080, 995, 840 cm$^{-1}$; $^1$H NMR δ 3.87 (s 4H), 3.87 (q, J=8.8 Hz, 4H), 4,46 (s, 4H); $^{13}$C NMR δ 43.69, 68.62 (q, J=35 Hz), 73.15, 75.59, 123.87 (q, J=275 Hz); $^{19}$F NMR δ −74.6(s). Anal. Calcd. for $C_9H_{12}F_6O_3$; C,38.31;H, 4.29; F, 40.40. Found: C, 38.30; H, 4.30; F, 40.19.

EXAMPLE 5

A poly-FOX-THF copolymer was prepared as follows: A 10 L jacketed reaction vessel with a condenser, thermocouple probe, and a mechanical stirrer was charged with anhydrous methylene chloride (2.8 L), and 1,4-butanediol (101.5 g, 1.13 moles). $BF_3THF$ (47.96 g, 0.343 moles) was then added, and the mixture was stirred for 10 minutes. A solution of 3-Fox, 3-(2,2,2-trifluoroethoxyl-methyl)-3-methyloxetane, made in accordance with U.S. Pat. Nos. 5,650, 483; 5,668,250; 5,663,289; or 5,668,251, (3,896 g. 21.17 moles) in anhydrous methylene chloride (1.5 L) was then pumped into the vessel over 5 hours. The reaction temperature was maintained between 38° C. and 42° C. throughout the addition. The mixture was then stirred at reflux for an additional 2 hours, after which $^1$H NMR indicated >98% conversion. The reaction was quenched with 10% aqueous sodium bicarbonate (1 L), and the organic phase was washed with 3% aq. HCl (4 L) and with water (4 L). The organic phase was dried over sodium sulfate, filtered, and stripped of solvent under reduced pressure to give 3,646 g (91.2%) of title glycol, a clear oil. NMR: The degree of polymerization (DP) as determined by TFAA analysis was 15.2 which translates to an equivalent weight of 2804. The THF content of this glycol, as determined by 1 H NMR, was 2.5% wt THF (6.2% mole THF). This example was included to teach how to polymerize partially fluorinated oxetane polymers.

EXAMPLE 6

TABLE 2

Synthesis of Poly-5-FOX-THF Copolymer at a DP of 20

| Compound | Scale | Ratio | Weight (S × Ratio) G | MW | Moles | Mole Ratio | δ | ml |
|---|---|---|---|---|---|---|---|---|
| 5-FOX Monomer[(1)] | 979.3 | 1.0 | 979.250 | 234.16 | 4.18 | 50.05 | 1.150 | 851.5 |
| THF | | 0 | 0.000 | 72.10 | 0.00 | 0.00 | 0.886 | 0.0 |
| Methylene Chloride | | 0.53 | 519.003 | 84.93 | 6.11 | 73.14 | 1.330 | 390.2 |
| Neopentyl glycol | | 0.02222 | 21.756 | 104.15 | 0.21 | 2.50 | 1.017 | 21.4 |
| $BF_3THF$ | | 0.01194 | 11.689 | 139.90 | 0.08 | 1.00 | 1.268 | 9.2 |
| Methylene Chloride | | 0.8 | 783.400 | 84.93 | 9.22 | 110.40 | 1.330 | 589.0 |
| 5% sodium bicarbonate | | 0.43 | 421.078 | 18.01 | 23.38 | 279.82 | 1.000 | 421.1 |
| Water | | 0.85 | 832.363 | 18.01 | 46.22 | 553.13 | 1.000 | 832.4 |
| Theoretical Yield (g) | 1007.03 | | | | | | | |
| Expected Yield, Low (g) | 906.33 | | | | | | | |
| Expected Yield, High (g) | 956.68 | | | | | | | |
| Solids Loading, % | 63.93 | | | | | | | |
| Max. Wt % $BF_3THF$ (incorporated as THF) | 1.16 | | | | | | | |
| | ml | | | | | | | |
| Initial Volume | 1272.36 | | | | | | | |
| Volume after quench, ml | 2282.46 | | | | | | | |
| Volume after wash, ml | 2693.75 | | | | | | | |

[(1)]5-FOX Monomer is oxetane with a pendant —$CH_2$—O—$CH_2$—$CF_2$—$CF_3$ and molecular weight of 234.16.

Methylene chloride (1019.003 grams, 11.99 moles, 766.17 ml) was charged to a 4 liter jacketed reaction vessel equipped with a reflux condenser, mechanical stirrer, temperature probe, monomer addition pump, and jacket temperature control. Neopentyl glycol (21.756 grams, 0.21 moles) and $BF_3THF$ (11.689 grams, 0.08 moles) were charged to the reactor with a temperature of 25° C. The neopentyl glycol dissolved upon addition of $BF_3THF$. The reaction was allowed to stir for 30 minutes. 5-FOX monomer addition was commenced with a reaction temperature of 25° C., and a reaction exotherm was observed within 5 minutes. Once the exotherm started, 5-FOX monomer was added over 75 minutes. The maximum temperature observed was 36.3° C. After complete addition of the monomer, the reaction mixture was heated to 35° C. for 4 hours. A sample was taken and analyzed by NMR, and a degree of polymerization of 21.35 was observed. Additional methylene chloride was added (283.4 grams, 213.08 ml). The reaction mixture was neutralized with 5% sodium bicarbonate solution (421.078, 21.0539 grams sodium bicarbonate, 0.2506 moles). The methylene chloride-polymer layer was then washed with deionized water (832.363 grams). A pH of 7 was observed. The water phase was separated. The polymer phase is distilled under reduced pressure to remove methylene chloride and dry the polymer. About 963.61 grams of poly-5-FOX-THF Copolymer DP 21.35 were isolated.

EXAMPLE 7

TABLE 3

Synthesis of Poly-3-FOX-co-Poly-Elf-FOX 25%

| Substance | Scale (g) | Ratio | Quantity (g) | MW | Eq | Mmoles | δ | ml |
|---|---|---|---|---|---|---|---|---|
| Elf FOX Monomer[1] | 3500 | 0.490577 | 1,717.02 | 532 | 5.00 | 3,227.48 | 1.4 | 1226.4 |
| 3-FOX Monomer[2] | | 0.509425 | 1,782.99 | 184.15 | 15.00 | 9,682.26 | 1.15 | 1550.4 |
| Neopentyl Glycol | | 0.0191986 | 67.20 | 104.1 | 1.00 | 645.49 | 1.06 | 63.4 |
| Heloxy 7 | | 0.0420488 | 147.17 | 228 | 1.00 | 645.49 | 0.91 | 161.73 |
| $BF_3THF$ | | 0.00806 | 28.21 | 139.9 | 0.31 | 201.64 | 1.1 | 25.6 |
| Oxsol 2000 | | 0.57 | 1,995.00 | 146.11 | 21.15 | 13,654.10 | 1.185 | 1683.5 |
| $CH_2Cl_2$ | | 0.205 | 717.50 | 84.93 | 13.09 | 8,448.13 | 1.326 | 541.1 |
| Quench (water) | | | 2,576.97 | 18.01 | 221.67 | 143,085.52 | 1.00 | 2577.0 |
| Wash (water) | | | 2,576.97 | 18.01 | 221.67 | 143,085.52 | 1.00 | 2577.0 |
| Theoretical Yield (g) | 3,728.91 | | | | | | | |
| Expected Yield, (95%) | 3,542.47 | | | | | | | |
| Solids Loading, (%) | 72.35% | | | | | | | |
| | ml | | | | | | | |
| Initial Volume | 5,153.94 | | | | | | | |
| Volume + Quench | 7,730.91 | | | | | | | |
| Volume + Wash | 7,730.91 | | | | | | | |

[1] Poly Elf FOX Monomer is oxetane with mixed pendant fluorinated $C_4$–$C_{16}$ alcohols from ALF Actochem
[2] 3-FOX Monomer is oxetane with a pendant Rf = $CF_3$.

Methylene chloride (717.50 grams, 8.45 moles, 541.1 ml) was charged to a 10 liter jacketed reaction vessel equipped with a reflux condenser, mechanical stirrer, temperature probe, monomer addition pump, and jacket temperature control. Neopentyl glycol (67.20 grams, 0.645 moles) and $BF_3THF$ (28.21 grams, 0.201 moles) were charged to the reactor with a temperature of 25° C. The neopentyl glycol dissolved upon addition of $BF_3THF$. The reaction was allowed to stir for 30 minutes. A solution of Elf-FOX monomer (1717.02 grams, 3.227 moles, 1226.4 ml), 3-FOX monomer (1,782.99 grams, 9.682 moles, 1550.4 ml), and Heloxy 7 (147.17 grams, 0.645 moles, 161.73 ml) in Oxsol 2000 (1995.00 grams, 1683.5 ml) was prepared. Addition of the monomer solution was commenced with a reaction temperature of 25° C., and a reaction exotherm was observed within 7 minutes. Once the exotherm started, monomer was added over 1 hour 55 minutes. The maximum temperature observed was 40.0° C. After complete addition of the monomer, the reaction mixture was heated to 35° C. for 4 hours. A sample was taken and analyzed by NMR, and a total FOX degree of polymerization of 18.67 was observed. The reaction mixture was neutralized with 5% sodium bicarbonate solution (2576.97 grams, 128.85 grams sodium bicarbonate, 1.53 moles). The methylene chloride-polymer layer was then washed with deionized water (2576 grams). A pH of 7 was observed. The water phase was separated. The polymer phase is distilled under reduced pressure to remove methylene chloride and dry the polymer. 3632.4 grams of poly-3-FOX-co-Elf-FOX 25% DP 18.67 was isolated. Final characterization showed 23.5% Elf-FOX, and a hydroxyl equivalent weight of 2640.6.

EXAMPLE 8

Synthesis of Poly-3-FOX-Z 10 Copolymer

An oxetane copolymer was produced in the same manner as described in Example 7 except the weight ratio of monomers was 90% 3-FOX monomer and 10% Z 10 monomer produced by DuPont. Z10 monomer is an oxetane monomer with mixed pendant fluorinated alkyl alcohol chains.

EXAMPLE 9

Synthesis of Fluorinated Polyoxetane-Polyester Polymers

Two hydroxyl-terminated fluorinated polyoxetanes were used to prepare different polyoxetane-polyester polymers. The first polyoxetane had 6 mole percent repeating units from THF with the rest of the polymer being initiator fragment and repeating units from 3-(2,2,2-trifluoroethoxylmethyl)-3-methyloxetane, i.e., 3-FOX (n=1, Rf=$CF_3$, and R=$CH_3$ in the formulas above) and had a $M_n$ of 3400. The second polyoxetane had 26 mole percent repeating units from THF with the residual being the initiator fragment and repeating units from 3-FOX.

The first and second fluorinated oxetane polymers were reacted with at least a 2 (generally 2.05-2.10) equivalent excess of adipic acid in a reactor at 235° C. for 3.5 hours to form a polyoxetane having the half ester of adipic acid as carboxyl end groups. (The preformed ester linkage and terminal carboxyl groups were used to bond the polyoxetane to a subsequently in situ-formed polyester.) NMR analysis was used to confirm that substantially all the hydroxyl groups on the polyoxetane were converted to ester groups. The average degree of polymerization of the first oxetane polymer was reduced from 18 to 14 during the reaction with adipic acid. The average degree of polymerizations of the second oxetane polymer remained at 18 throughout the reaction. The reactants were then cooled to about 149° C.

The adipic acid-functionalized polyoxetane was reacted with additional diacids and diols to form polyester blocks. The diacids were used in amounts of 24.2 pbw adipic acid and 24.5 pbw isophthalic acid or phthalate anhydride. The diols were used in amounts of 20.5 pbw cyclohexanedimethanol, 14.8 pbw neopentyl glycol, and 16.0 pbw trimethylol propane. The relative amounts of the adipate ester of the oxetane polymer and the polyester-forming components were adjusted to result in polyoxetane-polyesters with either 2 or 4 weight percent of partially fluorinated oxetane repeating units. The diacid and diol reactants were reacted in the same reactor used to form the carboxyl-functional polyoxetane but the reaction temperature was lowered to about 216° C. The reaction to form the polyoxetane-polyester polymer was continued until the calculated amount of water was generated.

EXAMPLE 10

Preparation and Testing of Coated Laminate Using a Fluorinated Polyoxetane-Modified Polyester The following ingredients were mixed and allowed to react:

| | |
|---|---|
| Resimene ™ CE-7103 methyl/butyl-etherified melamine formaldehyde resin | 31.4 pph |
| poly-5-FOX/polyester | 31.4 pph |
| n-propyl acetate | 20.7 pph |
| THF | 3.5 pph |
| isopropyl alcohol | 6.0 pph |
| p-toluene sulfonic acid | 4.0 pph |
| BYK ™-333 polyether-modified dimethylpolysiloxane copolymer | 0.7 pph |
| Acematt ™ TS100 fumed silica (Degussa Corp.; Fairlawn, Ohio) | 1.4 pph |
| Polyfluo ™ 190 fluorocarbon wax (Micro Powders, Inc.; Tarrytown, New York) | 0.9 pph |

The poly-5-FOX/polyester polymer was made from a 5-FOX polymer (made similarly to the 3-FOX polymer described in Example 9 reacted with adipic acid to form an ester linkage having a terminal carboxyl group and, subsequently, with ester-forming monomers in a manner substantially as set forth in Example 9 (with the acids being adipic acid and phthalate anhydride). Polyether-modified dimethylpolysiloxane copolymer and fluorocarbon wax were added to improve scratch and mar resistance, and fumed silica was added to control gloss.

Coatings were applied by gravure coating to 0.0305 cm (0.012 inch) thick PVC substrate sheets having a lightly embossed surface (E13 embossing). The resulting coated samples were dried in a forced air oven and partially cured at about 66° to 71° C. (150° -160° F.) for 10 to 20 seconds to form partially cured thermoformable laminates. Coating weights were 6-8 g/m² of substrate.

The laminates were thermoformed to MDF wood board using a membrane press. Coated PVC and laminate sequentially are placed over a MDF board. The membrane was heated to about 138° C. before being pulled tightly around the PVC film and MDF board by vacuum (thermoforming). (The maximum surface temperature of the PVC can be measured and recorded with a temperature indicating tape.) Heat was maintained for about a minute before being removed, and the membrane allowed to cool for 1 minute while vacuum was maintained.

The following test procedures were used to measure coating properties:

Scratch Resistance: Measured with a "Balance Beam Scrape Adhesion and Mar Tester" (Paul N. Gardner Co., Inc.; Pompano Beach, Fla.). A Hoffman stylus was used to scratch the coatings. Scratch resistance is the highest stylus load the coating can withstand without scratching.

Burnish Mar: Determined by firmly rubbing a polished porcelain pestle on the coating surface. The severity of a mark is visually assessed as:

| | |
|---|---|
| Severe | mark visible at all angles |
| Moderate | mark visible at some angles |
| Slight | mark visible only at grazing angles |
| None | no perceivable mark |

Solvent Resistance: A cloth towel was soaked with MEK and gently rubbed on the coated surface in a back and forth manner, with one back-and-forth movement counting as one rub. The coated surface was rubbed until the sooner of a break in the coating surface first becoming visible or 100 rubs.

Coating Crack: Corners and edges were visually inspected for cracks in the coating.

Cleanability/Stain: Measured by common household substances published by NEMA Standards Publications LD-3 for High Pressure Decorative Laminates. The method includes placing a spot of each test reagent on a flat surface of the laminated article and allowed to sit undisturbed for 16 hours. At that time, the stains were cleaned with different stain removers that are commonly used as commercial cleaners (e.g., Formula 409™, Fantastik™, etc.), baking soda, nail polish remover, and finally bleach. Depending on the difficulty (high values) or ease (low values) of removal, the total value from each test sample was determined.

| | Grade |
|---|---|
| Water | 0 |
| commercial cleaner | 1 |
| commercial cleaner + baking soda | 2 |
| nail polish remover | 3 |
| 5.0% solution of sodium hypochlorite (bleach) | 4 |

TABLE 4

Durability Testing

| | Coated and Fully Cured | Coated and Partially Cured | Uncoated |
|---|---|---|---|
| Hoffman Scratch | 2050 g | 1850 g | 1000 g |
| Burnish Mar | Slight | Slight | Moderate |
| Solvent resistance | 90 rubs | 60 rubs | 4 rubs |
| Coating crack | None | None | None |

The results of Table 4 indicate that the coated samples exhibit significantly greater Hoffman scratch and burnish mar resistances than uncoated PVC, and the fully cured (thermoformed) sample had better resistance than the non-fully cured sample. Similarly, the burnish resistances of the thermoformed and coated samples were greater than that of the uncoated PVC.

Stain remover values as described above were used in a progressive intensity stain-removing test scale. A "1" in the test result set forth in Tables 5-7 indicates the stain was not removed until a stronger stain remover was used.

TABLE 5

NEMA Stain Test Results (Coated + Fully Cured)

| | \multicolumn{5}{c}{Cleaning Reagents} | | |
| --- | --- | --- | --- | --- | --- | --- | --- |
| | 1 | 2 | 3 | 4 | 5 | Score | Stain |
| acetone | 1 | 1 | 1 | 1 | 1 | 5 | Moderate |
| coffee | | | | | | — | |
| tea | 1 | | | | | 1 | |
| mustard | 1 | 1 | 1 | | | 3 | |
| 10% iodine | 1 | | | | | 1 | |
| permanent marker | 1 | 1 | 1 | | | 3 | |
| #2 pencil | 1 | | | | | 1 | |
| wax crayon | 1 | | | | | 1 | |
| shoe polish | 1 | | | | | 1 | |
| | | | | | Total | 16 | |

TABLE 6

NEMA Stain Test Results (Coated and Partially Cured)

| | \multicolumn{5}{c}{Cleaning Reagents} | | |
| --- | --- | --- | --- | --- | --- | --- | --- |
| | 1 | 2 | 3 | 4 | 5 | Score | Stain |
| acetone | 1 | 1 | 1 | 1 | 1 | 5 | Moderate |
| coffee | | | | | | — | |
| tea | 1 | | | | | 1 | |
| mustard | 1 | 1 | | | | 2 | |
| 10% iodine | | | | | | — | |
| permanent marker | 1 | 1 | 1 | | | 3 | |
| #2 pencil | 1 | | | | | 1 | |
| wax crayon | 1 | | | | | 1 | |
| shoe polish | 1 | | | | | 1 | |
| | | | | | Total | 14 | |

TABLE 7

NEMA Stain Test Results (Uncoated PVC)

| | \multicolumn{5}{c}{Cleaning Reagents} | | |
| --- | --- | --- | --- | --- | --- | --- | --- |
| | 1 | 2 | 3 | 4 | 5 | Score | Stain |
| acetone | 1 | 1 | 1 | 1 | 1 | 5 | Moderate |
| coffee | 1 | 1 | | | | 2 | |
| tea | | | | | | — | |
| mustard | 1 | 1 | 1 | | | 3 | |
| 10% iodine | 1 | | | | | 1 | |
| permanent marker | 1 | 1 | 1 | 1 | 1 | 5 | Moderate |
| #2 pencil | 1 | 1 | | | | 2 | |
| wax crayon | 1 | 1 | | | | 2 | |
| shoe polish | 1 | 1 | 1 | | | 3 | |
| | | | | | Total | 23 | |

EXAMPLE 11

Coatings were prepared from the formulation listed below (pph are by weight):

| | |
| --- | --- |
| Methyl/butyl coetherified melamine-formaldehyde resin (Solutia, Resimene CE07103) | 25 pph |
| Fluorinated cyclic polyoxetane polyester | 80 pph |
| Fluorinated non-cyclic polyoxetane polyester | 20 pph |
| N-propyl acetate | 125 pph |
| Para-toluene sulfonic acid | 8.0 pph |
| Fumed silica (Degussa TS100) | 3.0 pph |
| Micronized fluorocarbon wax (Micro Powders Polyfluo 190) | 1.9 pph |

The fluorinated cyclic polyester was derived from trimethylol propane, 1,4-cyclohexane dimethanol, neopentyl glycol, adipic acid, adipic acid terminated perfluorinated polyoxetane, and phthalic anhydride. The fluorinated non-cyclic polyester was derived from neopentyl glycol, adipic acid and adipic acid terminated perfluorinated polyoxetane. The fumed silica was added to control coating gloss and the micronized fluorocarbon wax was added to improve scratch and mar resistance.

Coating compositions were applied to PVC sheets with wound rods and dried in a forced air oven at 71.1° C. (160° F.) for 30 sec to partially cure the coating composition and thereby form a partially cured laminate. Coating composition weights were approximately 3.0 grams/square meter of PVC substrate. The PVC substrate was 0.0305 cm (0.012 in) thick with a lightly embossed surface.

Thermoforming Procedure

The partially cured laminate was then thermoformed to medium density fiberboard (MDF) using a Greco membrane press. The press cycle used is described below:
1. Partially cured laminate was placed over an MDF board
2. A flexible membrane was laid over the partially cured laminate and MDF board
3. The membrane was heated to 138° C. (280° F.)
4. A vacuum pulled the membrane tightly around the laminate and MDF board, thermoforming the laminate to the MDF board. Heat was maintained for 1 minute.
5. Heat was removed and the membrane allowed to cool for 1 minute while the vacuum was maintained.
6. After 1 minute cooling, the vacuum was released, and the coated MDF board sample was removed.

The following test procedures were used to measure coating durability:

Boiling Water

Water was brought to a boil for ~6 min. Approximately 10 mL of water was poured on the sample and set a beaker of boiling water on the puddle of water on the sample for 20 min. The haze circle mark was assessed as follows:

| | |
| --- | --- |
| Severe: | Haze circle mark is visible at all angles |
| Moderate: | Haze circle mark is visible at some angles |
| Slight: | Haze circle mark is visible only at grazing angles |
| None: | No perceivable mark |

Scratch Resistance

Scratch resistance was measured with a "Balance Beam Scrape Adhesion and Mar Tester" that is manufactured by the Paul N. Gardner Company, Inc. A Hoffman stylus was used to scratch the coatings. The scratch resistance was based on the high stylus load the coating could withstand with out scratching.

Burnish Mar

Mar resistance was determined by firmly rubbing a polished porcelain pestle on the coating surface. The severity of a mark is visually assesses as:

| | |
|---|---|
| Severe: | Mark is visible at all angles |
| Moderate: | Mark is visible at some angles |
| Slight: | Mark is visible only at grazing angles |
| None: | No perceivable mark |

Solvent Resistance (MEK Double Rubs)

A cloth towel was soaked with methyl ethyl ketone (MEK) and gently rubbed on the coated surface of each sample in a back and forth manner. One back and forth movement was counted as one rub. The coated surface was rubbed until a break in the coating surface first became visible. The test is stopped after 100 double-rubs.

Coating Crack

The extensibility of the coating was assesses by visually inspecting the corners and edges of each sample for coating cracks.

Cleanability/Stain

Stain resistance was measured by common household substances published by NEMA Standards Publications LD-3 for High Pressure Decorative Laminates. The method consisted of placing place a spot of each test reagent, i.e. distilled water, acetone, household ammonia, citric acid solution, olive oil, tea, coffee, mustard, providone iodine, stamp ink, #2 pencil, wax crayon, and shoe polish, upon the flat surface of the laminated PVC. The samples were undisturbed for 16 hrs and after that the stain reactants were cleaned with different stain removers that are commonly used as commercial cleaners (i.e. 409 Fantastik™), baking soda, nail polish remover, and finally, bleach. Depending on the stain severity (high values) or ease (low values) of its removal, the total value from each test sample was determined.

Results

The samples showed no evidence of coating cracking after thermoforming. The samples showed excellent boiling water resistance and excellent stain resistance and cleanability. In particular at least some samples exhibited a NEMA (stain resistance) cleanability score of 14 or less and a NEMA boiling water test result of no mark.

EXAMPLE 12

Melamine resin (Resimene 747, 25.92 g) and polyester resin (Vr-248, Texas Resin, 74.78 g) were mixed with variable amounts of a Poly-Fox-3 polymer available from Aerojet in Sacramento, Calif. Isopropyl acetate 82.00 g and tetrahydrofuran (THF) 8.30 g were added to reduce the viscosity. A small amount of p-toluene sulfonic acid 39.6 g (10% solution in isopropanol) was added and the solution was mixed under shear for 5 minutes.

EXAMPLE 13

A smooth PVC film was coated with a solvent borne PVC/acrylate primer. A portion of the primed substrate was coated with the composition of Example 12 which had no Poly-Fox-3 (Example 13 Control) and a portion of the substrate was coated with the composition of Example 12 which had 2 parts by weight of Poly-Fox-3 per 100 parts by weight total of said polyester and melamine resins, (Example 13A). The coatings on Example 13 Control and Example 13A were cured at 200° F. (93° C.). Commercial dry erase markers were used to mark both examples. The resulting marks were easily removed with a dry cloth or eraser from Example 13A. The Example 13 Control erased partially but left severe shadowing using a dry eraser.

While in accordance with the patent statutes the best mode and preferred embodiment have been set forth, the scope of the invention is not intended to be limited thereto, but only by the scope of the attached claims.

What is claimed is:

1. A laminate comprising a layer derived from reactive ingredients comprising:
    (a) a polymer comprising at least one polyester segment and at least one polyether segment comprising monomeric units derived from oxetane and a pendent fluorinated group comprising:
        (i) a fluorocarbon moiety, and
        (ii) an ether moiety, wherein the fluorocarbon moiety is linked to the polyether segment via the ether moiety; and
    (b) a melamine resin.

2. A laminate according to claim 1 wherein the oxetane is selected from

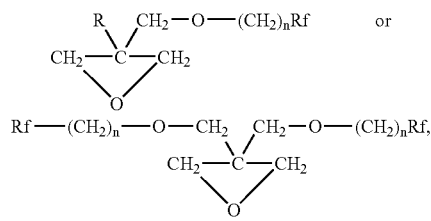

wherein n is an integer from 1 to 3, Rf is independently on each monomer a linear or branched alkyl group of from about 1 to about 20 carbon atoms being at least 25% perfluorinated with the H atoms of said Rf being replaced by F, and R is H or an alkyl of 1 to 6 carbon atoms.

3. The laminate of claim 2 wherein the polymer and the melamine resin are co-reactable.

4. The laminate of claim 3 wherein the polymer and the melamine resin are crosslinkable.

5. The laminate of claim 2 wherein the melamine resin is derived from reaction with formaldehyde.

6. The laminate of claim 2 wherein the melamine resin is at least partially alkylated.

7. The laminate of claim 6 wherein the melamine resin is at least partially alkylated by reaction with one or more C1-C4 alcohols.

8. The laminate of claim 7 wherein the melamine resin is at least partially alkylated by reaction with one or more alcohols selected from the group consisting of n-butanol, n-propanol, isopropanol, ethanol, and methanol.

9. The laminate of claim 2 comprising a substrate wherein the layer is disposed on the substrate.

10. The laminate of claim 2 wherein the substrate is thermoformable.

11. The laminate of claim 1 wherein the monomeric units derived from oxetane comprise the pendent fluorinated group having a formula: —$CH_2$—O—$(CH_2)_n$—Rf, wherein said Rf group is a linear or branched alkyl group of 1 to 20 carbon atoms with a minimum of 25 percent of the hydrogens of said alkyl groups being replaced by F, or said Rf group being an oxaperfluorinated or perfluorinated polyether having from 4 to 60 carbon atoms, and n being from 1 to 3.

12. The laminate of claim 11, wherein said Rf group is a linear or branched perfluorinated alkyl group of 1 to 20 carbon atoms.

13. The laminate of claim 8, wherein polyether segment comprises monomeric units derived from tetrahydrofuran.

14. A method for forming a laminate comprising steps of: providing a composition comprising reactive ingredients of:
   (a) a polymer comprising at least one polyester segment and at least one polyether segment, wherein the polyether segment comprises monomeric units derived from oxetane and a pendent fluorinated group comprising:
      (i) a fluorocarbon moiety, and
      (ii) an ether moiety, wherein the fluorocarbon moiety is linked to the polyether segment via the ether moiety; and
   (b) a melamine resin; and
incorporating the composition into a laminate.

15. The method of claim 14 where in the step of incorporating, (a) and (b) are reacted to form a crosslinked composition.

16. A reaction product derived from reactive ingredients comprising:
   (a) a polymer comprising at least one polyester segment and at least one polyether segment comprising monomeric units derived from oxetane, wherein the polyether segment comprising a pendent fluorinated group comprising:
      (i) a fluorocarbon moiety, and
      (ii) an ether moiety, wherein the fluorocarbon moiety is linked to the polyether segment via the ether moiety; and
   (b) a melamine resin.

17. A method for preparing a multilayered article comprising steps of:
   providing a composition comprising reactive ingredients of:
   (a) a polymer comprising at least one polyester segment and at least one polyether segment comprising units derived from oxetane, wherein the polyether segment comprises a pendent fluorinated group comprising:
      (i) a fluorocarbon moiety, and
      (ii) an ether moiety, wherein the fluorocarbon moiety is linked to the polyether segment via the ether moiety; and
   (b) a melamine resin; and
using the composition to form a layer on a substrate.

18. The method according to claim 17, wherein the substrate comprises a cellulosic product, fiber, synthetic polymer, metal, or ceramic.

19. The method according to claim 17, wherein the substrate includes a layer of plasticized vinyl chloride polymer.

20. The method according to claim 17, performed to make a wallcovering.

21. The method according to claim 20, performed to make a dry erase surface.

22. The method of claim 17 where in the step of using the composition to form a layer on a substrate comprises heating the composition to at least about 150° F.

\* \* \* \* \*